United States Patent
Bhatt et al.

(10) Patent No.: US 8,158,221 B2
(45) Date of Patent: Apr. 17, 2012

(54) REACTIVE INK AND INK-MEDIA SYSTEM FOR REDUCED AIR FADE ON POROUS MEDIA

(75) Inventors: Jayprakash C. Bhatt, Corvallis, OR (US); Larrie Deardurff, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1006 days.

(21) Appl. No.: 11/562,688

(22) Filed: Nov. 22, 2006

(65) Prior Publication Data

US 2008/0118677 A1  May 22, 2008

(51) Int. Cl.
*B41M 5/00* (2006.01)
(52) U.S. Cl. .................. 428/32.34; 428/32.28
(58) Field of Classification Search ............... 428/32.34, 428/32.28
See application file for complete search history.

(56) References Cited

U.S. PATENT DOCUMENTS

| | | |
|---|---|---|
| 5,380,769 A | 1/1995 | Titterington et al. |
| 5,439,514 A | 8/1995 | Kashiwazaki et al. |
| 5,928,789 A | 7/1999 | Chen et al. |
| 5,984,467 A * | 11/1999 | Bodager et al. ............... 347/101 |
| 6,136,448 A | 10/2000 | Roth et al. |
| 6,245,832 B1 | 6/2001 | Suzuki et al. |
| 6,368,397 B1 | 4/2002 | Ichizawa et al. |
| 6,648,953 B2 | 11/2003 | Yamazaki et al. |
| 6,860,930 B2 | 3/2005 | Wu et al. |
| 6,989,054 B2 | 1/2006 | Tanabe et al. |
| 2002/0198289 A1 | 12/2002 | Gummeson |
| 2003/0027892 A1 | 2/2003 | Wang et al. |
| 2003/0064202 A1 | 4/2003 | Deardurff et al. |
| 2003/0116747 A1 | 6/2003 | Lem et al. |
| 2003/0122905 A1 | 7/2003 | Suzuki et al. |
| 2003/0198801 A1 | 10/2003 | Wickramanayake et al. |
| 2003/0218269 A1 | 11/2003 | Maeda et al. |
| 2004/0019128 A1 | 1/2004 | Kondo |
| 2004/0110868 A1 | 6/2004 | Zhu et al. |
| 2004/0246319 A1 | 12/2004 | Ito et al. |
| 2004/0247882 A1 | 12/2004 | Kouchi et al. |
| 2005/0086750 A1 | 4/2005 | Deardurff et al. |
| 2005/0089652 A1 | 4/2005 | Kasahara et al. |
| 2005/0202186 A1 | 9/2005 | Deardurff et al. |
| 2005/0215664 A1 | 9/2005 | Elwakil et al. |
| 2005/0282928 A1 | 12/2005 | Lin et al. |
| 2005/0287312 A1 * | 12/2005 | Bhatt .................... 428/32.34 |
| 2006/0155005 A1 * | 7/2006 | Kondo et al. ................ 523/160 |

OTHER PUBLICATIONS

Miller-Stephenson Products, "EPI-REZ Waterborne Epoxy Resins," Copyright 2005, 2 pp. [Online] http://www.miller-stephenson.com/aero_006.htm.
Omnova Solutions Inc., "GENFLO 8045, High Gloss Modified Styrene Butadiene Latex," Copyright 2005 Omnova Solutions, Inc., 1 p.
Resolution Performance Products, "EPI-REZ Resin 3510-W-60," Copyright 2001 Resolution Performance Products LLC, 4 pp.
Resolution Performance Products, "EPI-REZ Resin 3522-W-60," Copyright 2001 Resolution Performance Products LLC, 3 pp.
Air Products, "Anquamine 401 Curing Agent," Epoxy Curing Agents and Modifiers, Pub. No. 125-9744, Air Products and Chemicals, Inc., 1 p.
Air Products, "Anquamine 419 Curing Agent," Epoxy Curing Agents and Modifiers, Pub. No. 125-9538A, Air Products and Chemicals, Inc., 1 p.

(Continued)

*Primary Examiner* — Betelhem Shewareged

(57) ABSTRACT

An ink for use in combination with, for example, an ink-jet printer. The ink comprises a carrier, a colorant in the carrier, and a component selected from a group consisting of amines, amides, and combinations thereof.

2 Claims, 2 Drawing Sheets

OTHER PUBLICATIONS

Air Products, "New Water-Based Epoxy Curing Agent for Ambient Cure Coatings Introduced by Air Products," Oct. 9, 1995, Air Products and Chemicals, Inc., 1 p. [Online] http://www.products.com/PressRoom/CompanyNews/Archived/1995/96002_OCT09.htm.

* cited by examiner

Comparison Illustrating Benefits of
Silica-based Porous Inkjet Receptive Media
Coated with Epoxy Resin and/or Printed with
Ink Containing Curing Agent

REACTIVE INK AND INK-MEDIA SYSTEM FOR REDUCED AIR FADE ON POROUS MEDIA

BACKGROUND

In ink-jet technology, image quality of high-resolution images can be a function of both the ink-jet ink used to produce an image, and the print medium upon which the image is printed. Desirable attributes of print quality include saturated colors, high gloss and gloss uniformity, and freedom of grain and coalescence, among other characteristics.

Once a high-resolution image is printed, however, another major issue arises, namely, image permanence, i.e., how long the quality of the image will last. As the photo industry continues to move from film to digital image methods, the issue of image permanence becomes much more important.

With respect to much of the print media currently on the market, printed images commonly exhibit undesirable characteristics relating to image permanence. One such undesirable characteristic is the gradual dye-fade that is sometimes observed when dye-based ink-jet inks are printed on porous media Such fade is caused by air and, more particularly, by small amounts of ozone in the air. It appears that, over time, ozone reacts with many dyes commonly used in ink-jet inks, causing them to break down and to lose or diminish their intended color properties. It should be noted that dye-fade is more of a problem with certain dyes than with others. For example, cyan dyes tend to be affected to a greater extent by the presence of ozone in the air than do other dyes.

Along with dye-fade, another significant undesirable characteristic is color-shift. It has been observed that when ozone reacts with ink-jet ink dyes, the intended color properties of a given dye may shift to another wavelength value along the visible spectrum. This effect causes a gradual change in the perceived colors of the printed image from what was originally intended.

Both of these undesirable characteristics, dye-fade and color-shift, gradually affect the appearance of the printed image. Because inkjet images printed on porous media are susceptible to these changes, many have been reluctant, especially in the graphics arts and photography industries, to embrace ink-jet printing of images that are intended to last a significant period of time.

In view of this, it would be beneficial to develop print media that provide increased ozone fastness and reduced color-shift for printed images, even when utilizing a wide variety of ink-jet inks and associated dyes.

BRIEF DESCRIPTION OF THE DRAWINGS

For a detailed description of exemplary embodiments of the invention, reference will now be made to the accompanying drawings, in which.

NOTATION AND NOMENCLATURE

Figure 1:
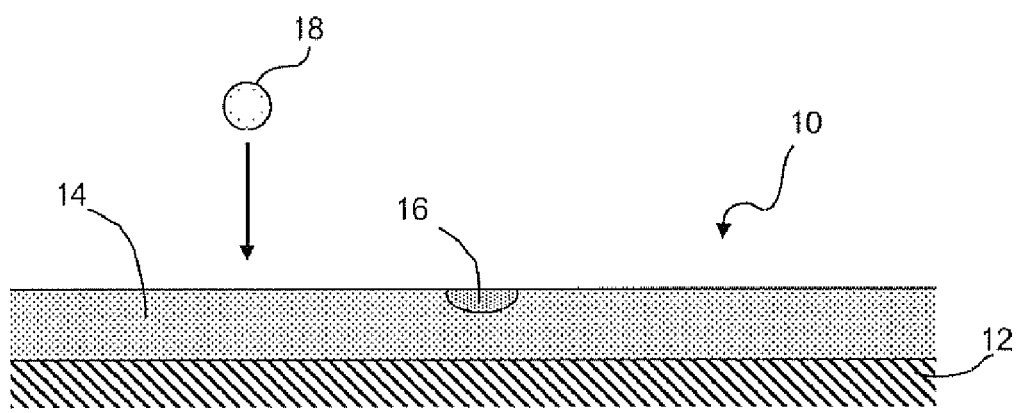
FIG. 1 is a schematic illustration of an imaging system according to an embodiment of the present invention.

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "comprising, but not limited to . . . ." Likewise, the singular forms "a," "an," and "the" include plural referents unless the context clearly dictates otherwise. Thus, for example, reference to "a dye" includes reference to one or more of such materials.

An "ink" or "ink-jet ink" refers to a liquid solution or dispersion composition that can comprise a liquid vehicle and a colorant, e.g., a dye. The liquid vehicle can be configured to be stable with the dye through a broad range of solution characteristics, and can be configured for ink-jet printing.

As used herein, "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as polymers, UV curable materials, and/or plasticizers in some embodiments.

"Media substrate" or "substrate" includes any substrate that can be coated with a coating composition of the present invention (to form an ink-receiving layer), and can include papers, overhead projector plastics or films, coated papers such as photobase, fabric, art paper such as water color paper, optical disks, or the like.

The terms "print medium" and "print media" refer to a media substrate that is coated with an ink-receiving layer.

"Porous medium" refers to any substantially inorganic particulate-containing coated medium having surface voids and/or cavities capable of absorbing the ink-jet inks in accordance with embodiments of the present invention. Typically, porous media include a substrate and a porous ink-receiving layer. As ink is printed on the porous media, the ink fills the voids and the outermost surface can become dry to the touch more quickly than in the case of traditional or swellable media. Common inorganic particulates that can be present in the coatings include metal or semi-metal oxide particulates such as silica or alumina. Additionally, such coatings are typically bound together by a polymeric binder, and optionally, can include mordants or ionic binding species that are attractive of classes of predetermined dye species.

The term "latex" or "latex dispersion" includes both latex particulates and the aqueous medium in which the latex particulates are dispersed. More specifically, as used herein, a "latex" is a liquid suspension comprising a liquid (such as water and/or other liquids) and polymeric particulates from 20 nm to 500 nm (preferably from 100 nm to 300 nm) in size, and having a weight average molecular weight from about 10,000 Mw to 2,000,000 Mw (preferably from about 40,000 Mw to 100,000 Mw). Typically, the polymeric particulate can be present in the liquid at from 0.5 wt % to 15 wt %. Such polymeric particulates can comprise a plurality of monomers that are typically randomly polymerized, and can also be crosslinked. When crosslinked, the molecular weight can be even higher than that cited above. Additionally, in one embodiment, the latex component can have a glass transition temperature from about −25° C. to 100° C.

The terms "latex particulates" and "latex particles" refer to the polymeric masses that are dispersed in a latex dispersion.

The term "glass transition temperature" refers to the temperature at which the properties of a polymer change from a rigid state to a more elastic state. In other words, a polymer is in a rigid state when the temperature is below the glass transition temperature for that polymer, and is in an elastic or flowable state when above the glass transition temperature. When heated above the glass transition temperature, latex particulates can begin to flow together to form a more continuous film.

The term "polyamine" includes any amine having at least two amine functionalities.

The term "polyamide" includes any amide having at least two amide functionalities.

The term "about" when referring to a numerical value or range is intended to encompass the values resulting from experimental error that can occur when taking measurements.

Concentrations, amounts, measurements, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

DETAILED DESCRIPTION

In accordance with aspects of the present invention, methods, coated print media, and printed images are provided. In certain embodiments of the present invention, a method is disclosed for producing a print medium that results in a reduction of dye-fade and/or color-shift over time by increasing ozone fastness. The method can include a step of coating a media substrate with a porous coating composition containing an epoxy resin and an optional latex or binder, so as to form a porous ink-receiving layer. Alternatively, the epoxy resin containing porous coating composition may be applied as a separate layer on top of a media with a porous ink-receiving layer. The method can also include a step of applying to the porous ink-receiving layer an ink that includes a curing agent for the epoxy. The curing agent can comprise an amine, an amide, or combinations thereof. The resulting printed medium can demonstrate increased ozone fastness and thus greater durability to dye-fade, color-shift, and other ozone related reactions over time.

Another embodiment of the present invention provides a printed medium hat having increased ozone fastness. The print medium can comprise a porous, epoxy-resin containing ink-receiving layer coated on a media substrate and an amine-containing ink used in conjunction with the ink-receiving layer. In some embodiments, the epoxy is omitted from the ink-receiving layer. In another embodiment, the epoxy resin is applied on the ink receiving layer and the amine curing agent is excluded from the ink. In still other embodiments, the epoxy resin and the amine curing agent form a sealing layer.

Porous Media

The coated print media typically includes a substrate and a microporous ink-receiving layer deposited on the substrate. Referring briefly to FIG. 1, there is shown an exemplary print medium 10 comprising a substrate layer 12 and a porous, ink-receiving layer 14. As is known, substrate 12 can be paper, plastic, coated paper, fabric, art paper, optical disks, or other known substrate used in the ink-jet printing arts. In one embodiment, photobase can be used as the substrate. Photobase is typically a three-layered system comprising a single layer of paper sandwiched by two polymeric layers, such as polyethylene layers Ink-receiving layer 14 preferably comprises any substantially inorganic particulate-containing coated medium having surface voids and/or cavities that are suitable for absorbing the ink-jet inks in accordance with embodiments of the present invention.

According to certain embodiments of the invention, ink-receiving layer 14 includes an epoxy resin. The epoxy resin containing porous coating composition can be applied as a separate layer on top of a porous ink-receiving layer, or can be formed concurrently with and as part of the porous ink-receiving layer.

In preferred embodiments, ink-receiving layer 14 is porous, so that ink applied to the layer can be effectively absorbed. Thus, in preferred embodiments, if the epoxy resin is applied as a layer on top of a porous ink-receiving layer, it forms a discontinuous, or porous, film.

Preferred epoxy resins include but are not limited to waterborne epoxy resins such as EpiRez 3510® and EpiRez 3522® resins, which are available commercially from Resolution Performance Products, Inc. Epi-Rez 3510® is a waterborne dispersion of a low molecular weight liquid Bisphenol A epoxy resin. Epi-Rez 3522® is a waterborne dispersion of a solid Bisphenol A epoxy resin.

Additional exemplary epoxy resins include those having tri- or higher functionality, which include but are not limited to: N,N,N',N'-tetraglycidyl-4,4'-diaminodiphenyl methane, N,N,N',N'-tetraglycidyl-3,3'-diethyl-4,4'-diaminodiphenyl methane, N,N,O-triglycidyl-m-aminophenol. N,N,O-triglycidyl-p-aminophenol, N,N,O-triglycidyl-p-aminocresol, and N,N,N',N'-tetraglycidyl-m-xylenediamine.

Exemplary di-functional epoxy resins include but are not limited to diglycidyl ether of bisphenol A, diglycidyl ether of bisphenol F, diglycidyl ether of bisphenol AD, diglycidyl ether of bisphenol S, diglycidyl ether of tetrabromobisphenol A, diglycidyl ether of tetramethylbisphenol F, diglycidyl ether of 4,4'-dihydroxydiphenyl sulfide, resorcinol diglycidyl ether, diglycidyl ether of 2,5-di-tert-butylhydroquinone, diglycidyl ether of 1,6-dihydroxynaphthalene, diglycidyl ether of 4,4'-dihydroxybiphenyl, diglycidyl ether of 3,3',5,5'-tetramethyl-4,4'-dihydroxybiphenyl, diglycidyl ether of 9,9-bis (4-hydroxyphenyl)fluorene, N,N-diglycidyl aniline, N,N-diglycidyl-o-toluidine, epoxy resin having an oxazolidone ring that is produced by reaction of two molecules of a diglycidyl ether of bisphenol A with one molecule of tolylene diisocyanate, diglycidyl ethers in the form of a condensation product of two molecules of 2,6-xylenol and one molecule of dicyclopentadiene, diglycidyl phthalate, and diglycidyl terephthalate.

Additional epoxy resins having di- or higher and lower than tri-functionality include condensation products of formaldehyde and phenol or its substituent derivative, polyglycidyl ethers in the form of a condensation product of dicycolpentadiene and phenol or its substituent derivative, polyglycidyl ether of phenol aralkyl resin.

The epoxy resin according to the invention can also comprise an aliphatic epoxy resin, including but not limited to: 3,4-epoxycyclohexylmethyl-3,4-epoxycyclohexanecarboxylate, bis(2,3-epoxycyclopentyl)ethers, diglycidyl hexahydrophthalate, and neopentylene glycol diglycidyl esters.

In addition to the epoxy resin, ink-receiving layer 14 may include inorganic semi-metal or metal oxide particulates, a polymeric binder, and optionally, mordants and/or other porous coating composition agents can be present in porous ink-receiving layer 14. In certain embodiments, the inorganic semi-metal or metal oxide particulates can be silica, alumina, boehmite, silicates (such as aluminum silicate, magnesium silicate, and the like), titania, zirconia, calcium carbonate, clays, and combinations thereof. In a more detailed aspect, the particulates can be alumina, silica, or aluminosilicate. Each of these inorganic particulates can be dispersed throughout a porous coating composition, which can be applied to a media substrate to form the porous ink-receiving layer. Typically, the inorganic particulates are present in the coating composition at from 60 wt % to 95 wt %. In a few specific embodiments, boehmite can be present in the coating composition at from 85 wt % to 95 wt %, or silica or silicates can be present in the coating composition at from 75 wt % to 85 wt %.

In order to bind the inorganic particulates together in the coating composition, a polymeric binder is typically included. Exemplary polymeric binders that can be used include polyvinyl alcohol (PVA) and water-soluble copolymers thereof; polyvinyl acetate (PVAc), polyvinyl pyrrolidone, modified starches including oxidized and etherified starches; water soluble cellulose derivatives including carboxymethyl cellulose, hydroxyethyl cellulose; polyacrylamide including its derivatives and copolymers; casein; gelatin; soybean protein; silyl-modified polyvinyl alcohol, conjugated diene copolymer latexes including maleic anhydride resin, styrene-butadiene copolymer, and the like, acrylic polymer latexes including polymers and copolymers of acrylic and methacrylic acids, styrene-acrylate latexes, and the like; vinyl polymer latexes including ethylene-vinyl acetate copolymers; functional group-modified latexes including those obtained by modifying the above-mentioned polymers with monomers containing functional groups (e.g., carboxyl, amino, amido, sulfo, etc.); aqueous binders of thermosetting resins including melamine resins, urea resins, and the like; synthetic resin binders including polymethyl methacrylates, polyurethane resins, polyester resins, amide resins, vinyl chloride-vinyl acetate copolymers, polyvinyl butyrals, and alkyl resins. Such binders can be present to bind the porous ink-receiving layer together, but can also be present in small enough amounts to maintain the porous nature of the porous ink-receiving layer. In accordance with embodiments of the present invention, the polymeric binder can be present in the coating composition at from 5 wt % to 40 wt %. In specific embodiments where boehmite is used, the polymeric binder can be present at from 3 wt % to 15 wt %. Alternatively, where silica or silicates are used, the polymeric binder can be present at from 10 wt % to 25 wt %. In another specific embodiment, the binder can be polyvinyl alcohol or derivatives thereof.

In an embodiment where epoxy resin is applied as a separate layer on top of porous ink-receiving layer, other latexes and additives besides the epoxy resin are also included. Such additives may include non-film forming latexes having glass transition temperatures between 20-100° C. The following are examples of specific commercial latex formulations. This list is not meant to be limiting to the scope of the invention, but merely to provide information regarding possibly useful latexes. For example, Genflo 8045®, available from Omnova Solutions, Inc., is an anionic emulsion of carboxylated styrene butadiene polymer particulates with a glass transition temperature of about 54° C. Sunsphere™ latex, available from Rohm & Hass, is an acrylic hollow core specialty latex with a glass transition temperature greater than 50° C. Another example that is also available from Rohm & Haas is a cationic acrylic latex polymer having a glass transition temperature of 65-75° C. These and other latexes can be used to form a discontinuous film of epoxy resin on top of the porous ink-receiving layer.

Optionally, the porous ink-receiving layer can also be modified with an ionic binding species or mordant known to interact with a predetermined class of colorants, thereby increasing permanence. Typical mordants that can be included in the coating composition (and thus, included in the porous ink-receiving layer) include hydrophilic, water dispersible, or water soluble polymers having cationic groups (amino, tertiary amino, amidoamino, pyridine, imine, and the like). These cationically modified polymers can be compatible with water-soluble or water dispersible binders and have little or no adverse effect on image processing or colors present in the image. Suitable examples of such polymers include, but are not limited to, polyquaternary ammonium salts, cationic polyamines, polyamidins, cationic acrylic copolymers, guanidine-formaldehyde polymers, polydimethyl diallylammonium chloride, diacetone acrylamide-dimethyldiallyl ammonium chloride, polyethyleneimine, and a polyethyleneimine adduct with epichlorhydrin. Aside from mordants, other optional components that can be present in the porous ink-receiving layer can include anionic surfactants, cationic surfactants, biocides, plasticizers, optical brighteners, viscosity modifiers, leveling agents, UV absorbers, hindered amine stabilizers, anti-ozonants, silane coupling agents, and/or other known additives.

The ink-receiving layer can be a single layer or a multilayer coating designed to absorb sufficient quantities of ink to produce high quality printed images. The coating composition may be applied to the media substrate to form the ink-receiving layer by any means known to one skilled in the art, including blade coating, air knife coating, rod coating, wire rod coating, roll coating, slot coating, slide hopper coating, gravure, curtain, and cascade coating. The ink-receiving layer can be printed on one or both sides of the media substrate. In one embodiment of the present invention, the depth of the ink-receiving layer formed by the coating composition can be from about 20 μm to about 60 μm. In accordance with a few specific embodiments, the thickness for boehmite-containing coating compositions can be from 40 μm to 55 μm, the thickness for silica- or silicate-containing coating compositions can be from 25 μm to 35 μm. If epoxy resin containing porous layer is applied as a media topcoat, the thickness can range from 0.1 μm to 10 μm, and in a more specific embodiment, from 1 μm to 5 μm.

Ink Composition

The ink compositions that can be used in an ink-jet printer to form printed images on the media of the present invention are typically prepared in an aqueous formulation or liquid vehicle that can include water, colorants, co-solvents, surfactants, buffering agents, biocides, sequestering agents, viscosity modifiers, humectants, binders, and/or other known additives. In one aspect of the present invention, the liquid vehicle can comprise from about 70 wt % to about 99.9 wt % by weight of the ink-jet ink composition.

As described, co-solvents can be included in the ink-jet compositions of the present invention. Suitable co-solvents for use in the present invention include water soluble organic co-solvents, but are not limited to, aliphatic alcohols, aromatic alcohols, diols, glycol ethers, poly(glycol) ethers, lactams, formamides, acetamides, long chain alcohols, ethylene glycol, propylene glycol, diethylene glycols, triethylene glycols, glycerin, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of co-solvents that are preferably employed in the practice of this invention include, but are not limited to, 1,5-pentanediol, 1,2-hexanediol, 2-pyrrolidone, 2-ethyl-2-hydroxymethyl-1-,3-propanediol, diethylene glycol, 3-methoxybutanol, and 1,3-dimethyl-2-imidazolidinone. Co-solvents can be added to reduce the rate of evaporation of water in the ink-jet to minimize clogging or other properties of the ink such as viscosity, pH, surface tension, optical density, and print quality. The co-solvent concentration can range from about 5 wt % to about 25 wt %, and in one embodiment is from about 10 wt % to about 20 wt %. Multiple co-solvents can also be used, as is known in the art.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethyl-ethanolamine; hydrochloric acid; and other basic or acidic components which do not substantially interfere with the bleed control or optical density characteristics of the present invention. If used, buffering agents typically comprise less than about 10 wt % of the ink-jet ink composition.

In another aspect of the present invention, various biocides can be used to inhibit growth of undesirable microorganisms. Several non-limiting examples of suitable biocides include benzoate salts, sorbate salts, commercial products such as NUOSEPT®, available from Nudex, Inc., a division of Huls America, UCARCIDE®, available from Union Carbide, N.Y., VANCIDE®, available from RT Vanderbilt Co., NY, and PROXEL®, available from Arch UK Biocides Limited, United Kingdom, as well as other known biocides. Typically, such biocides comprise less than about 5 wt % of the ink-jet ink composition and often from about 0.1 wt % to about 0.25 wt %.

In an additional aspect of the present invention, binders can be included in the ink to help protect the colorants on the substrate. Binders suitable for use in the present invention typically have a molecular weight of from about 500 Mw to about 5,000 Mw. Non-limiting examples include but are not limited to polyester, polyester-melamine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

If surfactants are used, they can include water-soluble surfactants such as alkyl polyethylene oxides, alkyl phenyl polyethylene oxides, polyethylene oxide (PEO) block copolymers, acetylenic PEO, PEO esters, PEO amines, PEO amides, and dimethicone copolyols can be used. Such surfactants can be present at from 0.01°% to about 10% by weight of the ink-jet ink composition.

Colorants included in the ink-jet ink of the printed image embodiment of the present invention can be dyes, such as are known. With respect to the various ink-jet ink dyes, either a cationic dye or an anionic dye can be used. In one embodiment of the present invention, the anionic dye can be a chromophore having a pendent anionic group. Though any effective amount of dye can be used, preferably, the anionic dye can be present in the ink composition at from about 0.1 wt % to about 10 wt %.

Examples of suitable anionic dyes that can be used include a large number of water-soluble acid and direct dyes. Specific examples of anionic dyes include Direct Yellow 86, Acid Red 249, Direct Blue 199, Direct Black 168, Reactive Black 31, Direct Yellow 157, Reactive Yellow 37, Acid Yellow 23, Reactive Red 180, Acid Red 52, Acid Blue 9, Direct Red 227, Acid Yellow 17, Direct Blue 86, Reactive Red 4, Reactive Red 56, Reactive Red 31, and Direct Yellow 132; Aminyl Brilliant Red F-B (Sumitomo Chemical Co.); the Duasyn line of "salt-free" dyes available from Hoechst; mixtures thereof; and the like. Further examples include Bernacid Red 2BMN, Pontamine Brilliant Bond Blue A, BASF X-34, Pontamine, Food Black 2, Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brilliant Blue EFFA, all available from Bayer, Procion Turquoise PA, Procion Turquoise HA, Procion Turquoise Ho5G, Procion Turquoise H-7G, Procion Red MX-5B, Procion Red MX 8B GNS, Procion Red G, Procion Yellow MX-8G, Procion Black H-EXL, Procion Black P-N, Procion Blue MX-R, Procion Blue MX-4GD, Procion Blue MX-G, and Procion Blue MX-2GN, all available from ICI Americas; Cibacron Red F-B, Cibacron Black BG, Lanasol Black B, Lanasol Red 5B, Lanasol Red B, and Lanasol Yellow 46, all available from Ciba-Geigy; Baslien Black P-BR, Baslien Yellow EG, Baslien Brilliant Yellow P-3GN, Baslien Yellow M-6GD, Baslien Brilliant Red P-3B, Baslien Scarlet E-2G, Baslien Red E-B, Baslien Red E-7B, Baslien Red M-5B, Baslien Blue E-R, Baslien Brilliant Blue P-3R, Baslien Black P-BR, Baslien Turquoise Blue P-GR, Baslien Turquoise M-2G, Baslien Turquoise E-G, and Baslien Green E-6B, all available from BASF; Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, all available from Sumitomo Chemical Company; Intracron Yellow C-8G, Intracron Red C-8B, intracron Turquoise Blue GE, Intracron Turquoise HA, and intracron Black RL, all available from Crompton and Knowles, Dyes and Chemicals Division; Pro-Jet 485 (a copper phthalocyanine); Magenta 377; mixtures thereof, and the like. This list is intended to be merely exemplary, and should not be considered limiting. Similarly, a large range of cationic dyes can be used.

Still further, and according to embodiments of the invention, the present inks can include a curing agent for epoxy resin, comprising an amine, an amide, or combinations thereof. Any amine or amide known to one skilled in the art that can result in curing of the epoxy resin can be used, and is considered to be within the scope of the present invention.

Effective polyamines include, but are not limited to, polymeric epoxy-amine adducts, oligomeric epoxy-amine adducts, aliphatic polyamines, aromatic polyamines, and combinations and mixtures thereof. In one embodiment, the amine formulation present in the aqueous coating composition comprises a mixture of an aliphatic polymeric amine and a polyetherdiamine. Commercial formulations that are similar to this embodiment, and that are considered to be within the scope of the present invention, include Anquamine 401® and Anquamine 419®, manufactured by Air Products and Chemicals Inc. The formulation for Anquamine 401® includes an aliphatic polymeric amine, poly(oxo(methyl-1,2-ethanediyl), α-(2-aminomethyl)ethyl-ω-(2-aminomethylethoxy), and tetraethylenepentamine in water. The formulation for Anquamine 419® includes an epoxy-aliphatic polymeric amine adduct.

Other curing agents that can be used in the inks of the present invention include EpiKure 8535® and EpiKure 8536® from Resolution Performance Products, Inc. EpiKure 8535® is a modified aliphatic amine and polyethylene polyamine and EpiKure 8536® is a polyamido amine. Alternatively, amides can be utilized in the aqueous coating composition in conjunction with or in lieu of the amines noted above. In one embodiment, polyamides are included, an example of which includes, without limitation, polyacrylamide.

Operation

When it is desired to make a mark using the ink-media system of the present embodiments, an ink droplet 18 is applied to layer 14 and is absorbed into the surface of layer 14, leaving a mark, as at 16. The curing agent(s) in the ink react with the epoxy resin in the paper, if present, so as to form a cured epoxy coating, which may or may not be continuous. The coating, in turn, greatly reduces the rate of fade and image degradation on the printed medium.

EXAMPLES

By way of illustration, two print media were tested with three ink compositions. The print media were untreated silica-based porous inkjet receptive media coated with a coating that included 947% Epireze® 3510, 5% Genflo® 8045 and 0.3% Zonyl® FSA. The epoxy resin containing coating formulation was applied as a separate layer on top of the porous inkjet receptive medium.

Figure 2:
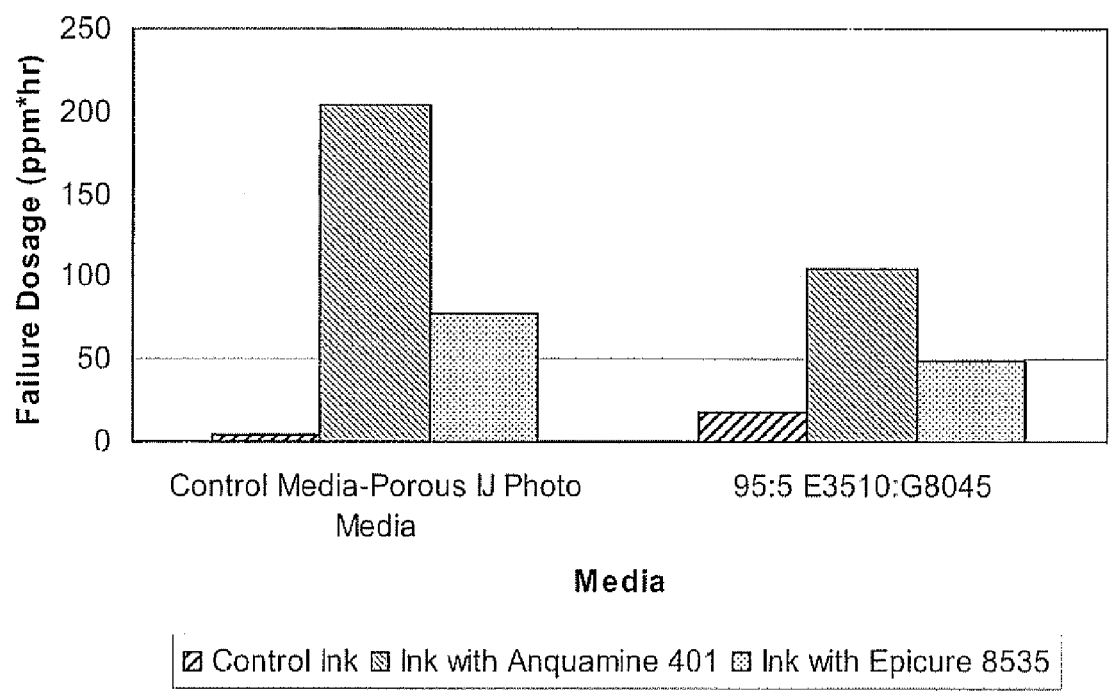
FIG. 2 is chart comparing the ink-media systems of certain embodiments to a control system that does not include features in accordance with the invention.

The inks applied to the coated medium consisted of a control ink, free of curing agent, and two inks each containing a curing agent and having the composition set out in Table 1. The results are shown in FIG. 2 and clearly illustrate the desirable properties of an ink/media printing system comprising an epoxy-coated paper and ink containing curing agent, as both ink-media systems outperformed the combination of control ink on an untreated medium. Specifically, an increase in the failure dosage was observed for the control ink when it was applied to the epoxy-coated medium. Likewise, each curing agent included in the ink caused an increase in failure dosage as compared to the control ink.

TABLE 1

| Ink Compositions | | | | |
|---|---|---|---|---|
| Components | 10% AQ401 | 10% EpiKure 8535 | Control | |
| 1,5-pentanediol | 0.00 | 10.00% | 1,5-pentanediol | 2.70% |
| 2-pyrrolidone | 0.00 | 5.00% | 2-pyrrolidone | 5.00% |
| 1,2,6-hexanetriol | — | — | 1,2,6-hexanetriol | 9.70% |
| Tergitol 15-S-7 | 1.50% | 1.50% | Triton X-100 | 1.50% |
| Tergitol 15-S-5 | 0.50% | 0.50% | Tergitol 15-S-12 | 0.70% |
| Proxel GXL | 0.10% | 0.10% | Proxel GXL | 0.10% |
| Bis-tris | 0.26% | 0.26% | Bis-tris | 0.26% |
| Anquamine AQ 401 | 10.00% | — | Anquamine AQ 401 | — |
| EpiKure 8535 | — | 10.00% | EpiKure 8535 | — |
| Dye-DJR 814 | 4.50% | 4.50% | Dye-DJR 814 | 4.5% |
| Water | balance | balance | Water | balance |
| Total | 100.00% | 100.00% | Total | 100.00% |

The above discussion is meant to be illustrative of the principles and various embodiments of the present invention. Numerous variations and modifications will become apparent to those skilled in the art once the above disclosure is fully appreciated. For example, the substrate, carriers, epoxies, and curing agents may each be varied from those identified herein. It is intended that the following claims be interpreted to embrace all such variations and modifications.

What is claimed is:

1. An ink/media system for use in combination with an ink-jet printer, comprising:
    a printing medium comprising a substrate and a porous ink-receiving coating thereon, said coating including an epoxy resin; and
    an ink comprising a colorant in a carrier, said ink further including a curing agent for said epoxy resin, wherein said curing agent is capable of reacting with said epoxy resin in the coating when the ink is received by the ink-receiving coating to cure the resin, wherein said curing agent comprises at least one polyamine selected from the group consisting of polymeric epoxy-amine adducts, oligomeric epoxy-amine adducts, aliphatic polyamines and aromatic polyamines.

2. The ink/media system of claim 1 wherein said curing agent comprises a polyamidoamine adduct.

* * * * *